(12) United States Patent
Park et al.

(10) Patent No.: US 10,671,198 B2
(45) Date of Patent: Jun. 2, 2020

(54) DISPLAY DEVICE

(71) Applicant: SILICON WORKS CO., LTD., Daejeon-si (KR)

(72) Inventors: Jong Min Park, Daejeon (KR); Hyun Woo Jeong, Daejeon (KR); Ha Na Choi, Daejeon (KR); Hun Yong Lim, Daejeon (KR)

(73) Assignee: Silicon Works Co., Ltd., Daejeon-si (KR)

( * ) Notice: Subject to any disclaimer, the term of this patent is extended or adjusted under 35 U.S.C. 154(b) by 10 days.

(21) Appl. No.: 16/196,722

(22) Filed: Nov. 20, 2018

(65) Prior Publication Data

US 2019/0155432 A1    May 23, 2019

(30) Foreign Application Priority Data

Nov. 21, 2017 (KR) .................. 10-2017-0155723

(51) Int. Cl.
```
G09G 3/36        (2006.01)
G06F 3/041       (2006.01)
G09G 3/20        (2006.01)
G09G 3/3208      (2016.01)
G06F 3/044       (2006.01)
```
(52) U.S. Cl.
CPC .......... *G06F 3/0412* (2013.01); *G06F 3/0416* (2013.01); *G09G 3/2096* (2013.01); *G09G 3/3208* (2013.01); *G09G 3/36* (2013.01); *G06F 3/044* (2013.01); *G09G 2310/08* (2013.01); *G09G 2330/021* (2013.01); *G09G 2370/04* (2013.01); *G09G 2370/08* (2013.01); *G09G 2370/10* (2013.01)

(58) Field of Classification Search
CPC ................ G06F 3/0416; G09G 3/2096; G09G 2370/08; G09G 2370/10; G09G 2370/04; G09G 3/3275; G09G 3/3685; G09G 3/3688; G09G 3/3692; G09G 2310/0294
See application file for complete search history.

(56) References Cited

U.S. PATENT DOCUMENTS

| | | | |
|---|---|---|---|
| 2018/0059832 A1* | 3/2018 | Cho | G09G 3/3648 |
| 2019/0121476 A1* | 4/2019 | Jang | G06F 3/0412 |
| 2019/0129564 A1* | 5/2019 | Kim | G06F 3/04166 |

FOREIGN PATENT DOCUMENTS

| | | |
|---|---|---|
| KR | 10-1037559 | 5/2011 |
| KR | 10-2018-0043442 | 4/2018 |
| KR | 10-2018-0075168 | 7/2018 |
| KR | 10-1885186 | 8/2018 |

* cited by examiner

*Primary Examiner* — Dennis P Joseph
(74) *Attorney, Agent, or Firm* — Polsinelli PC

(57) ABSTRACT

Provided is a display device that transmits and receives data on the basis of a MPI protocol. The display device includes a microcontroller, source drivers, and first and second MPI buses, wherein the microcontroller and the source drivers perform bi-directional communication on the basis of the MPI protocol in which transmission types for occupying the first and second MPI buses are set.

20 Claims, 14 Drawing Sheets

FIG. 7

| Dummy Clock | Header (16-bit) | Register Address (16-bit) | Data (16-bit * n , n: length) |

FIG. 8

| 1 | 1 | 1 | 1 | MCU Command

| 1 | 1 | 1 | 0 | MCU All Chip Write Command

| 1 | 1 | 0 | 1 | SRIC Read Data mode

| 1 | 1 | 0 | 0 | SRIC Data Ready Command

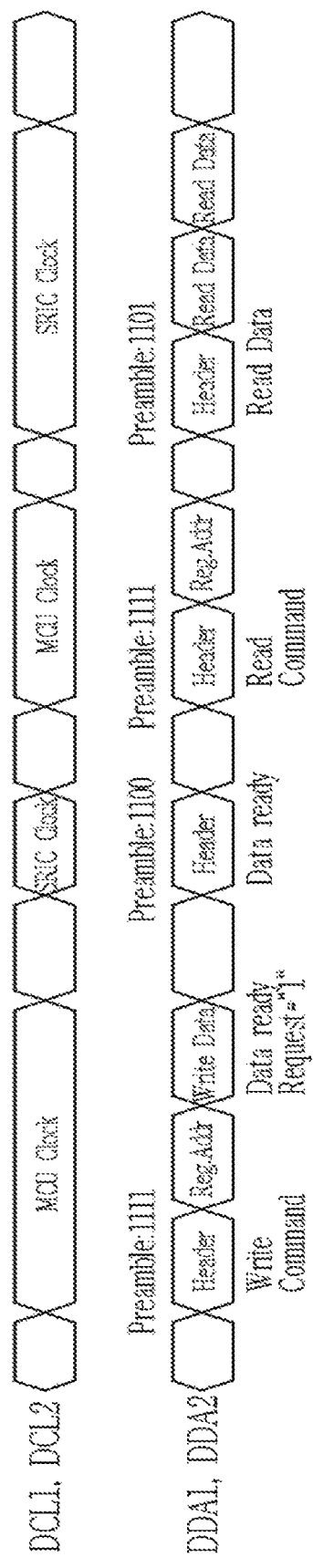

DISPLAY DEVICE

BACKGROUND OF THE INVENTION

Field of the Invention

The present invention relates to a display device, and more particularly, to a display device that transmits and receives data on the basis of a multi point-to-point interface (MPI) protocol.

Description of the Related Art

With the development of information oriented society, demands for a display device for displaying an image increase in various forms, and various types of display devices such as liquid crystal display devices and organic light emitting display devices are utilized.

Furthermore, a display device capable of processing touch input according to user convenience and device characteristics is provided. The display device capable of processing touch input is applied to various electronic appliances such as notebooks, monitors, and home appliances as well as portable terminals such as smart phones.

Such a display device includes a plurality of source drivers and a microcontroller. The source drivers provide a source signal for displaying an image to a display panel, reads touch data detected by a touch sensor of the display panel, and provides the read touch data to the microcontroller. The microcontroller controls the source drivers to be able to read the touch data from the display panel, and calculates a touch coordinate by using the touch data.

In the display device according to the related art, the microcontroller and the source drivers communicate with each other on the basis of a serial to peripheral interface (SPI) protocol. Since this is TTL communication, it is vulnerable to electromagnetic interference (EMI), and there is a problem that the number of pins and the number of lines increase because the microcontroller and the source drivers are connected to each other through individual ports due to a transfer rate problem.

SUMMARY OF THE INVENTION

Accordingly, the present invention has been made in an effort to solve the problems occurring in the related art, and an object of the present invention is to provide a multi point-to-point interface (MPI) protocol-based display device capable of improving a transfer rate and electromagnetic interference (EMI) and reducing the number of pins, the number of lines, and current consumption.

A display device according to an embodiment of the present invention includes first and second source drivers configured to receive a first clock signal and a first data signal from a microcontroller on the basis of a multi point-to-point interface (MPI) protocol, acquire read data by driving touch sensors of a display panel, and transmit a second clock signal and a second data signal including the read data on the basis of the MPI protocol; the microcontroller configured to transmit the first clock signal and the first data signal to the first and second source drivers on the basis of the MPI protocol, receive the second clock signal and the second data signal on the basis of the MPI protocol, and calculate a touch coordinate of the display panel by using the read data included in the second data signal; and first and second MPI buses configured to connect the first and second source drivers and the microcontroller to each other such that data communication is possible between the first and second source drivers and the microcontroller. A transmission type for occupying the first and second MPI buses between the microcontroller and the first and second source drivers is set in the MPI protocol.

A display device according to an embodiment of the present invention includes a microcontroller including first and second transmission buffers that transmit a first clock signal and a first data signal to a plurality of source drivers on the basis of a multi point-to-point interface (MPI) protocol and first and second reception buffers that receive a second clock signal and a second data signal from the plurality of source drivers on the basis of the MPI protocol; the plurality of source drivers including third and fourth transmission buffers that transmit a second clock signal and a second data signal to the microcontroller on the basis of the MPI protocol and third and fourth reception buffers that receive the first clock signal and the first data signal from the microcontroller on the basis of the MPI protocol; a first MPI bus configured to connect the first and second transmission buffers of the microcontroller and the third and fourth reception buffers of the plurality of source drivers to each other such that data communication is possible between the first and second transmission buffers of the microcontroller and the third and fourth reception buffers of the plurality of source drivers; and a second MPI bus configured to connect the first and second reception buffers of the microcontroller and the third and fourth transmission buffers of the plurality of source drivers to each other such that data communication is possible between the first and second reception buffers of the microcontroller and the third and fourth transmission buffers of the plurality of source drivers. A transmission type for occupying the first and second MPI buses between the microcontroller and the plurality of source drivers is set in the MPI protocol.

According to embodiments of the present invention, it is possible to perform bi-directional communication through first and second MPI buses shared on the basis of a MPI protocol, so that it is possible to improve a transfer rate and electromagnetic interference (EMI) and reduce the number of pins and the number of lines.

Furthermore, the on and off of reception buffers of a microcontroller and reception buffers of source drivers are controlled by a MPI protocol, so that it is possible to reduce current consumption as compared with a general MPI.

BRIEF DESCRIPTION OF THE DRAWINGS

The above objects, and other features and advantages of the present invention will become more apparent after a reading of the following detailed description taken in conjunction with the drawings, in which:

FIG. 7 is a diagram for explaining a MPI protocol;

FIG. 8 is a diagram for explaining a preamble code included in a header of FIG. 7;

FIG. 14 is a timing diagram for explaining a data ready operation of the MPI protocol-based display device.

DETAILED DESCRIPTION OF PREFERRED EMBODIMENTS

Figure 1:
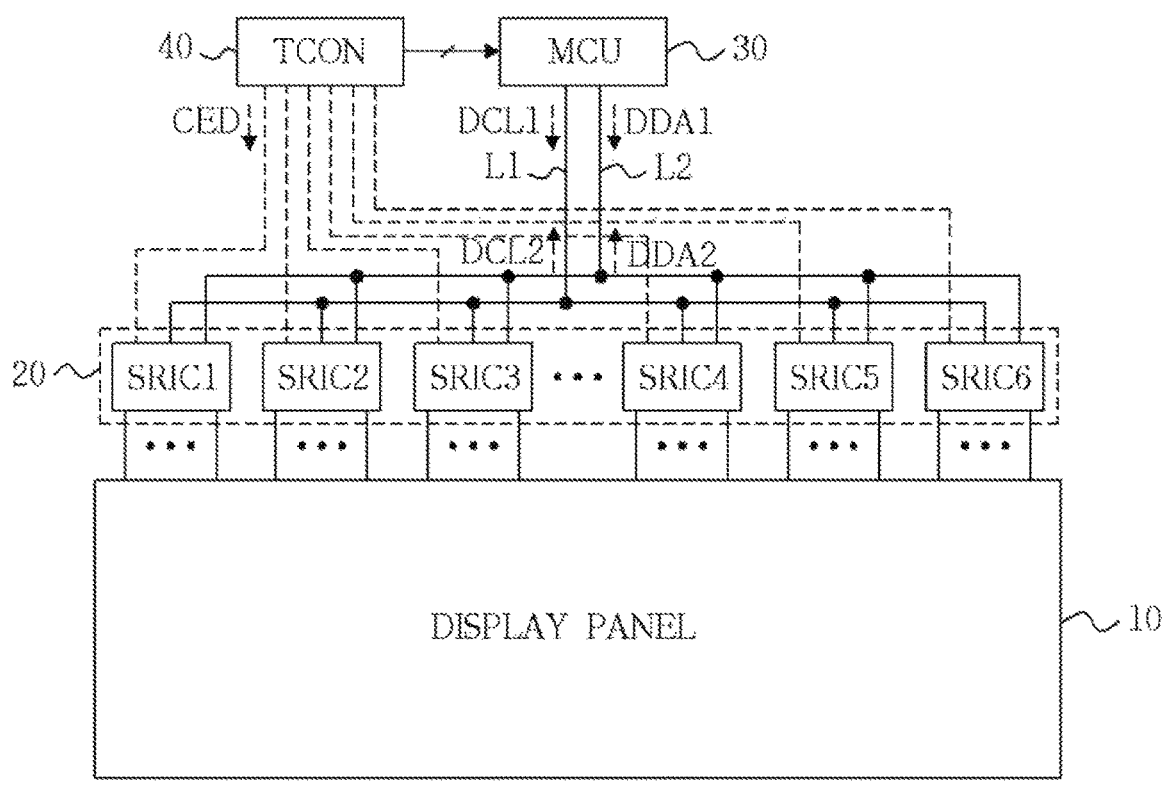
FIG. 1 is a block diagram illustrating a MPI protocol-based display device according to an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Since an embodiment described in the present specification and configurations illustrated in the drawings are preferred embodiments of the present invention and do not represent all the technical scopes of the present invention, there may be various equivalents and modification examples which can substitute for them at the time of application of the present invention.

FIG. 1 is a block diagram illustrating a MPI protocol-based display device according to an embodiment of the present invention.

Referring to FIG. 1, the display device includes a display panel 10, source drivers 20, a microcontroller 30, and a timing controller 40.

The display panel 10 is a display panel capable of detecting a touch and detects a touch to the display panel 10 by using touch sensors. The display panel 10 may display an image through a pixel array in which pixels are arranged in a matrix form and detect a touch to the display panel 10 by using a touch electrode serving as a common electrode in a capacitive manner.

The source drivers 20 receive an input signal CED from the timing controller 40, restores a clock signal and image data from the input signal CED, and provides the display panel 10 with a source signal corresponding to the image data restored using the restored clock signal.

Furthermore, the source drivers 20 receives a first clock signal DCL1 and a first data signal DDA1 from the microcontroller 30, and acquires read data by driving the touch sensors of the display panel 10 by using the first clock signal DCL1 and the first data signal DDA1.

Furthermore, the source drivers 20 provides the microcontroller 30 with a second clock signal DCL2 and a second data signal DDA2 including the read data. In such a case, the source drivers 20 may use a clock signal PCLK, which has been restored from the input signal CED, or an internal clock signal OSC CLK, which has been generated in an internal oscillator, as the second clock signal DCL2 according to display-on/off periods. Alternatively, the source drivers 20 may use a clock signal ECLK provided from the microcontroller 30 as the second clock signal DCL2.

The microcontroller 30 provides the source drivers 20 with the first clock signal DCL1 and the first data signal DDA1, receives the second clock signal DCL2 and the second data signal DDA2 including the read data from the source drivers 20, and calculates a touch coordinate of the display panel 10 by using the read data.

First and second MPI buses L1 and L2 connect the source drivers 20 and the microcontroller 30 to each other such that bi-directional data communication is possible between the source drivers 20 and the microcontroller 30 on the basis of the MPI protocol. In the MPI protocol, transmission types for occupying the first and second MPI buses L1 and L2 may be set. The MPI protocol will be described in detail with reference to FIG. 7 and FIG. 8.

The microcontroller 30 transmits the first clock signal DCL1 and the first data signal DDA1 to the source drivers 20 through the first and second MPI buses L1 and L2 on the basis of the MPI protocol, and the source drivers 20 transmits the second clock signal DCL2 and the second data signal DDA2 including the read data to the microcontroller 30 through the first and second MPI buses L1 and L2 on the basis of the MPI protocol.

In the MPI protocol, it is possible to set a transmission type in which the microcontroller 30 transmits the first clock signal DCL1 and the first data signal DDA1 to the source drivers 20 through the first and second MPI buses L1 and L2, and a transmission type in which the source drivers 20 transmits the second clock signal DCL2 and the second data signal DDA2 to the microcontroller 30 through the first and second MPI buses L1 and L2, and the microcontroller 30 and the source drivers 20 transmit/receive data through the first and second MPI buses L1 and L2 on the basis of the MPI protocol that defines the transmission types. The format of the MPI protocol will be described in detail with reference to FIG. 7 and FIG. 8.

The timing controller 40 receives image data and timing signals from a host system (not illustrated), performs image processing such as image quality correction on the image data, and provides the source drivers 20 with the input signal CED in which a clock has been embedded in data (image and control data). Furthermore, the timing controller 40 may control touch detection of the display panel 10 or provide the microcontroller 30 with control signals required for calculating touch coordinates.

Figure 2:
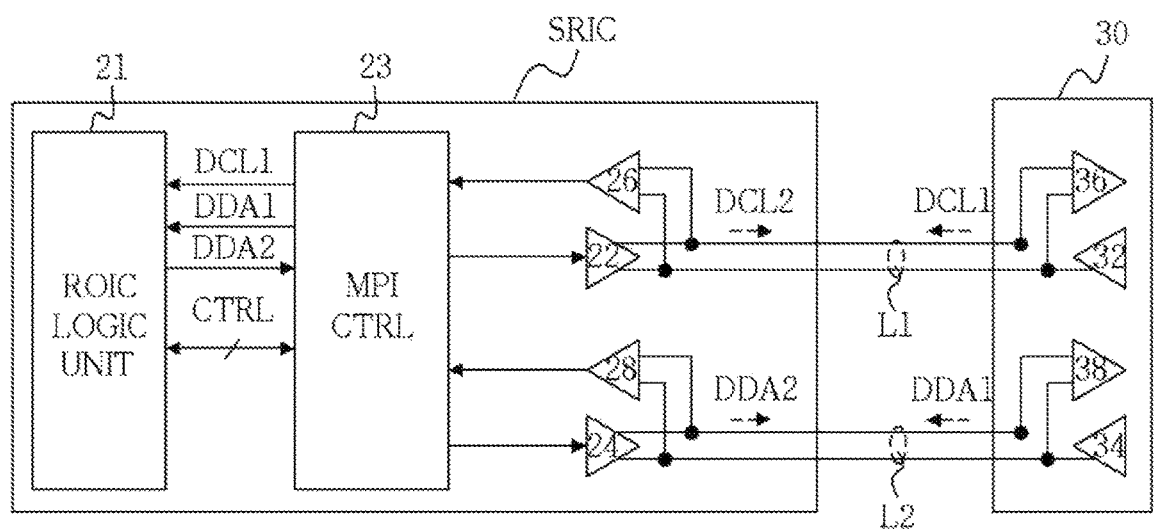
FIG. 2 is a block diagram for explaining data communication between source drivers and a microcontroller of FIG. 1.

FIG. 2 is a block diagram for explaining data communication between one source driver SRIC of the source drivers 20 of FIG. 1 and the microcontroller 30.

Referring to FIG. 2, the microcontroller 30 includes first and second transmission buffers 32 and 34 that respectively transmit the first clock signal DCL1 and the first data signal DDA1 to the first and second MPI buses L1 and L2, and first and second reception buffers 36 and 38 that respectively receive the second clock signal DCL2 and the second data signal DDA2 from the source driver SRIC through the first and second MPI buses L1 and L2, wherein the first clock signal DCL1 and the first data signal DDA1 are differential signals and the second clock signal DCL2 and the second data signal DDA2 are differential signals. The on and off of the first and second reception buffers 36 and 38 may be controlled by the MPI protocol.

Each of the source drivers 20 includes third and fourth transmission buffers 22 and 24 that respectively transmit the second clock signal DCL2 and the second data signal DDA2 to the first and second MPI buses L1 and L2, and third and fourth reception buffers 26 and 28 that respectively receive the first clock signal DCL1 and the first data signal DDA1 from the microcontroller 30 through the first and second MPI buses L1 and L2, wherein the second clock signal DCL2 and the second data signal DDA2 are differential signals and the first clock signal DCL1 and the first data signal DDA1 are differential signals. The on and off of the third and fourth reception buffers 26 and 28 may be controlled by the MPI protocol.

Furthermore, each of the source drivers 20 includes a MPI controller 23 and a ROIC logic unit 21. The MPI controller 23 provides the ROIC logic unit 21 with the first clock signal DCL1 and the first data signal DDA1 received from the microcontroller 30 through the third and fourth reception buffers 26 and 28, and the ROIC logic unit 21 acquires read data by driving the touch sensors of the display panel 10 by using the first clock signal DCL1 and the first data signal DDA1.

The ROIC logic unit 21 provides the MPI controller 23 with e second data signal DDA2 including the read data, and the MPI controller 23 provides the microcontroller 30 with the second clock signal DCL2 and the second data signal DDA2 including the read data through the third and fourth transmission buffers 22 and 24. The second clock signal DCL2 may use the clock signal PCLK restored from the input signal CED, or the internal clock signal OSC CLK generated in the internal oscillator. Alternatively, the second clock signal DCL2 may use the clock signal ECLK provided from the microcontroller 30.

In the display device according to the present embodiment, the first clock signal DCL1 and the first data signal DDA1, which are differential signals, and the second clock signal DCL2 and the second data signal DDA2, which are differential signals, are transmitted and received through the first and second MPI buses L1 and L2 shared by the source drivers 20 on the basis of the MPI protocol, so that it is possible to improve a transfer rate and electromagnetic interference (EMI) and to reduce the number of pins and the number of lines.

Furthermore, in the display device according to the present embodiment, the on and off of the first and second reception buffers 36 and 38 of the microcontroller 30 and the on and off of the third and fourth reception buffers 26 and 28 of the source drivers 20 are controlled by the MPI protocol, so that it is possible to reduce current consumption as compared with a general MPI.

Figure 3:
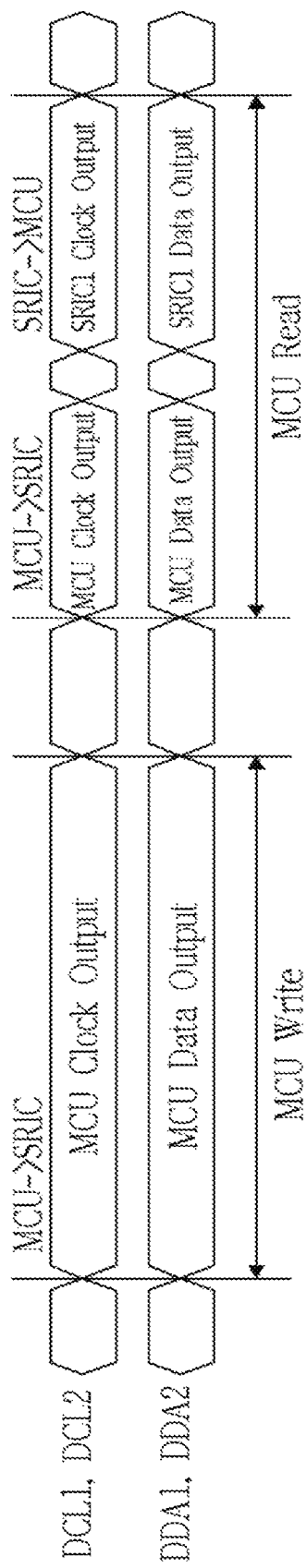
FIG. 3 is a timing diagram for explaining an operation of the MPI protocol-based display device according to an embodiment of the present invention.

FIG. 3 is a timing diagram for explaining the operation of the MPI protocol-based display device according to an embodiment of the present invention.

Referring to FIG. 3, the display device may operate in a write period and a read period. In the write period, the microcontroller 30 provides all the source drivers 20 with the first clock signal DCL1 and the first data signal DDA1 through the first and second MPI buses L1 and L2 on the basis of the MPI protocol. Then, the source drivers 20 writes the first data signal DDA1 in an internal register. Alternatively, in the write period, the microcontroller 30 may provide a specific source drivers SRIC with the first clock signal DCL1 and the first data signal DDA1, and the source drivers SRIC writes the first data signal DDA1 in an internal register.

In the read period, the microcontroller 30 provides the specific source drivers SRIC with the first clock signal DCL1 and the first data signal DDA1 through the first and second MPI buses L1 and L2 on the basis of the MPI protocol. The first data signal DDA1 may include read request data. Then, the source drivers SRIC provides the microcontroller 30 with the second clock signal DCL2 and the second data signal DDA2 through the first and second MPI buses L1 and L2 on the basis of the MPI protocol. The second data signal DDA2 may include read data corresponding to a touch detection result of the display panel 10.

Figure 4:
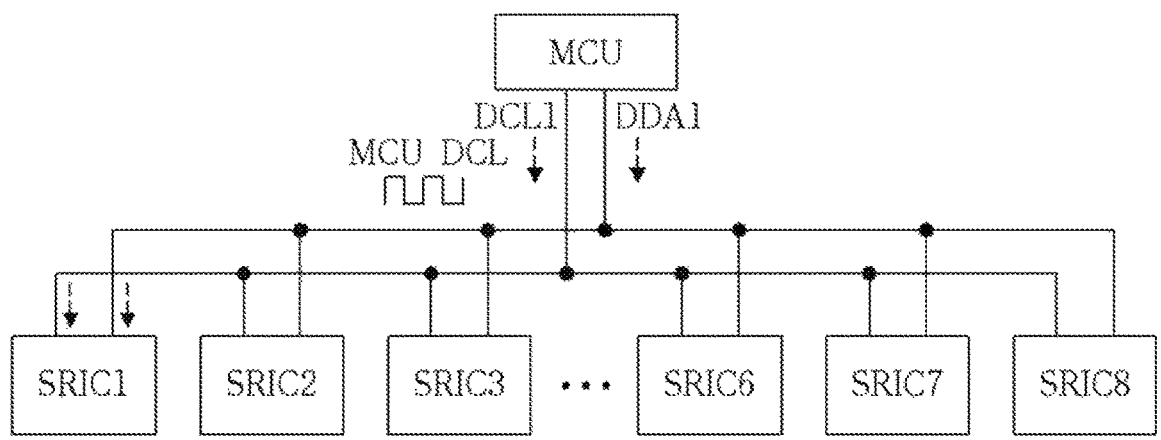
FIG. 4 and FIG. 5 are block diagrams for explaining an operation of the display device in a write period and a read period of FIG. 3.
Figure 5:
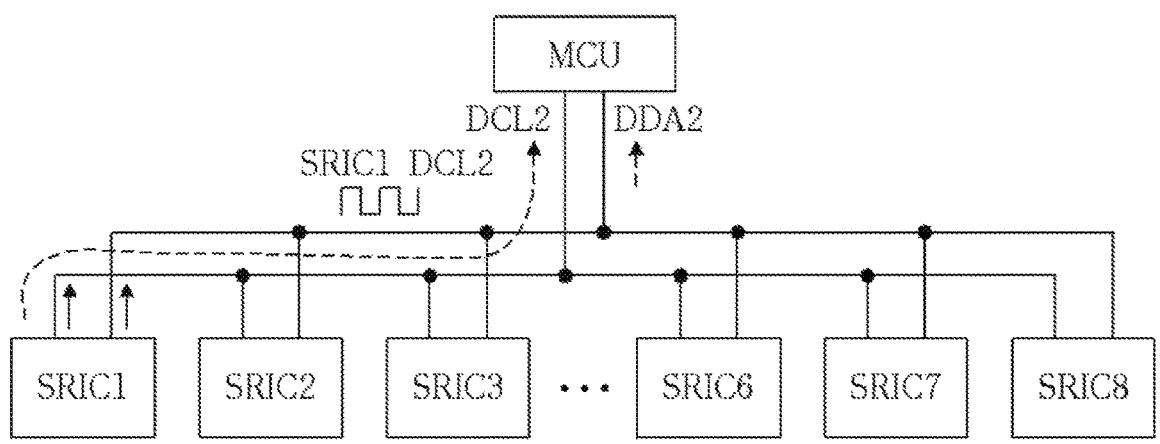

FIG. 4 and FIG. 5 are block diagrams for explaining the operation of the display device in the write period and the read period of FIG. 3. FIG. 4 and FIG. 5 illustrate that the microcontroller 30 transmits write and read requests to a first source drivers SRIC1.

Referring to FIG. 4, in the write period, the microcontroller 30 provides the first source drivers SRIC1 with the first clock signal DCL1 and the first data signal DDA1 through the first and second MPI buses L1 and L2 on the basis of the MPI protocol, or in the read period, the microcontroller 30 provides the first source drivers SRIC1 with the first clock signal DCL1 and the first data signal DDA1 including read request data through the first and second MPI buses L1 and L2 on the basis of the MPI protocol.

Referring to FIG. 5, the first source drivers SRIC1 having received the read request may provide the microcontroller 30 with the second clock signal DCL2 and the second data signal DDA2 including read data through the first and second MPI buses L1 and L2 on the basis of the MPI protocol in the read period. In such a case, the first source drivers SRIC1 may use, as the second clock signal DCL2, the clock signal PCLK restored from the input signal CED, the internal clock signal OSC CLK generated in the internal oscillator, or the clock signal ECLK provided from the microcontroller 30.

Figure 6:
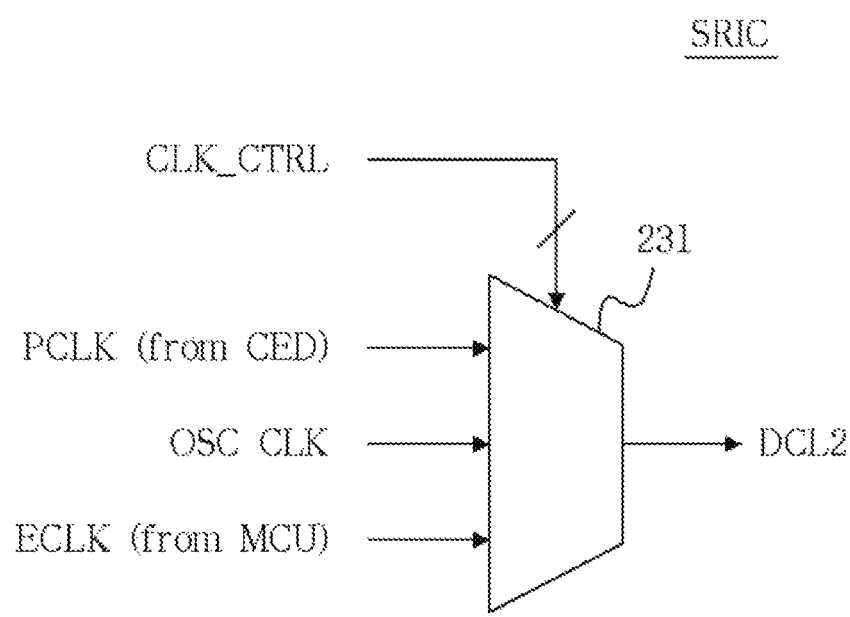
FIG. 6 is a block diagram for explaining an operation in which the source driver of FIG. 1 provides a second clock signal.

FIG. 6 is a block diagram for explaining the operation in which the source driver of FIG. 1 provides the second clock signal.

The source drivers SRIC may include a selector 231 that selects the second clock signal DCL2. The selector 231 may select the clock signal PCLK restored from the input signal CED or the internal clock signal OSC CLK generated in the internal oscillator, as the second clock signal DCL2 according to a clock selection signal CLK_CTRL. Alternatively, the selector 231 may select the clock signal ECLK provided from the microcontroller 30, as the second clock signal DCL2. The logic combination of the clock selection signal CLK_CTRL may be changed according to display-on and display-off periods.

For example, in the display-on period, the selector 231 may select the clock signal PCLK restored from the input signal CED as the second clock signal DCL2, or may select a clock signal obtained by dividing the restored clock signal PCLK as the second clock signal DCL2.

In the display-off period, the selector 231 may select the internal clock signal OSC CLK generated in an oscillator provided in the source drivers SRIC, as the second clock signal DCL2, or may select the clock signal ECLK provided from the microcontroller 30 as the second clock signal DCL2.

FIG. 7 is a diagram for explaining the MPI protocol and FIG. 8 is a diagram for explaining a preamble code included in a header of FIG. 7.

Referring to FIG. 7 and FIG. 8, the MPI protocol may be formed in the format of a dummy clock, a header (16 bits), a register address (16 bits), and data (16 bits). The first and second data signal DDA1 and DDA2 are transmitted in the above format.

The dummy clock may be used in order to control the on and off of the first and second reception buffers 36 and 38 of the microcontroller 30 and the third and fourth reception buffers 26 and 28 of the source drivers 20. For example, the first and second data signal DDA1 and DDA2 corresponding to the dummy clock may be set to be inputted at a logic low level, and the third and fourth reception buffers 26 and 28 of the source drivers 20 and the first and second reception buffers 36 and 38 of the microcontroller 30 may be set to be woken up in correspondence to the first and second clock signals DCL1 and DCL2 corresponding to the dummy clock.

The header may be used in order to define a command transmission type of the microcontroller 30 and the source driver SRIC, a data length, write and read commands, and addresses of the source drivers 20. For example, the header may be formed in the format of a preamble code (4 bits), a data length (7 bits), a read and write (1 bit), and a device address (4 bits).

The preamble code is a code for defining the transmission type of the microcontroller 30 and the source drivers 20 and may be used as occupation information on the first and second MPI buses L1 and L2. The preamble code may define the command transmission type of the microcontroller 30, and may define the read data transmission type and the data ready command transmission type of the source driver SRIC. The transmission type may be decided according to the logic levels of bits, and the first and second MPI buses may be set to be occupied according to the transmission type. For example, as illustrated in FIG. 8, the preamble code may include 4 bits, wherein the upper 2 bits may define a start bit and the lower 2 bits may define a transmission type.

For example, when the preamble code is (1,1,1,1), it indicates a first transmission type in which the microcontroller 30 transmits a write or read command to the specific source driver SRIC. When the preamble code is (1,1,1,0), it indicates a second transmission type in which that the microcontroller 30 transmits a write command to all the source drivers 20. When the preamble code is (1,1,0,1), it indicates a third transmission type in which that the specific source driver SRIC transmits read data to the microcontroller 30. When the preamble code is (1,1,0,0), it indicates a fourth transmission type in which that the specific source driver SRIC transmits a data ready command to the microcontroller 30. As described above, the preamble code defines the transmission types according to the logic levels of bits.

The microcontroller 30 may occupy the first and second MPI buses L1 and L2 in the first transmission type of putting the write or read command into the first data signal DDA1 and transmitting the first data signal DDA1 to any one of the source drivers 20. Furthermore, the microcontroller 30 may occupy the first and second MPI buses L1 and L2 in the second transmission type of putting the write command into the first data signal DDA1 and transmitting the first data signal DDA1 to all the source drivers 20.

Any one of the source drivers 20 may be set to receive authority for the transmission of the read data or the data ready command from the microcontroller 30. The specific source driver SRIC having the authority may occupy the first and second MPI buses L1 and L2 in the third transmission type of putting the read data into the second data signal DDA2 and transmitting the second data signal DDA2 and the fourth transmission type of putting the data ready command into the second data signal DDA2 and transmitting the second data signal DDA2.

Furthermore, the data length (7 bits) of FIG. 7 indicates that write and read of maximum 127 data are possible, and the read and write (1 bit) may be used in order to distinguish write and read commands in the command transmission type according to the logic level of the corresponding bit. The device address (4 bits) may be used in order to select a device address corresponding to a source driver which performs transmission among max 16 source drivers.

FIG. 9 to FIG. 13 are timing diagrams for explaining the operation of the display device according to the MPI protocol of FIG. 7.

Figure 9:
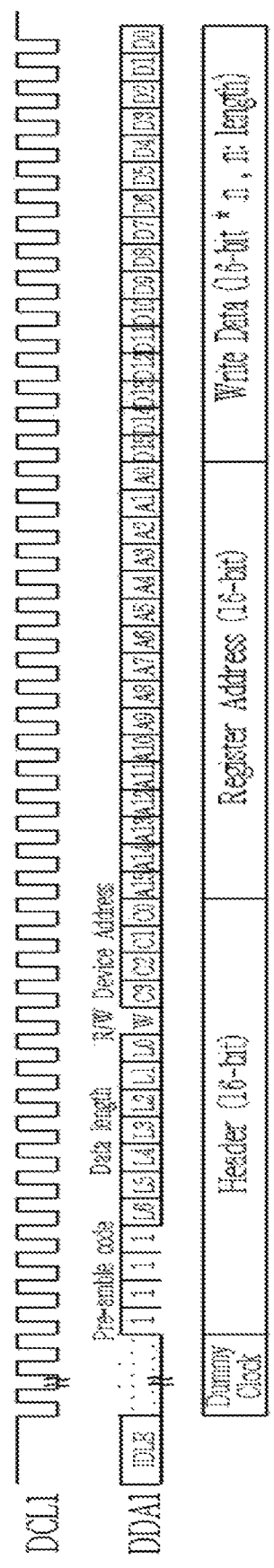
FIG. 9 to FIG. 13 are timing diagrams for explaining an operation of the MPI protocol-based display device.

Referring to FIG. 9, the preamble code of the header indicates (1,1,1,1) and the command indicates write. This defines the MPI protocol when the microcontroller 30 writes data in the specific source driver SRIC.

The microcontroller 30 occupies the first and second MPI buses L1 and L2 in order to write data in the specific source driver SRIC, and transmits the first clock signal DCL1 and the first data signal DDA1 to the source drivers 20. The first data signal DDA1 includes a dummy clock, a header, a register address, and write data, wherein the header includes a header indicates a preamble code (1,1,1,1), a write command, and a device address corresponding to the specific source driver SRIC.

In the source drivers 20, the third and fourth reception buffers 26 and 28 are woken up in response to the first clock signal DCL1 corresponding to the dummy clock, and the specific source driver SRIC corresponding to the device address writes the write data in an internal register. Other source drivers not corresponding to the device address may be configured to turn off the third and fourth reception buffers 26 and 28 in order to reduce current consumption.

Figure 10:
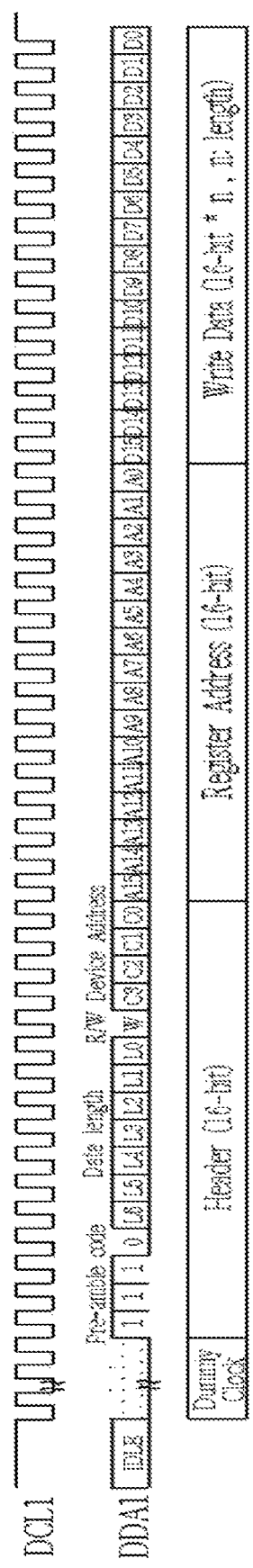

Referring to FIG. 10, the preamble code of the header indicates (1,1,1,0) and the command indicates write. This defines the MPI protocol when the microcontroller 30 writes data in all the source drivers 20. In such a case, the device address is ignored (don't care) and operates only for a write command. Reading of all the source drivers 20 is not supported.

The microcontroller 30 occupies the first and second MPI buses L1 and L2 in order to write data in all the source drivers 20, and transmits the first clock signal DCL1 and the first data signal DDA1 to the source drivers 20. The first data signal DDA1 includes a dummy clock, a header, a register address, and write data, wherein the header includes a preamble code (1,1,1,0) and a write command.

In all the source drivers 20, the third and fourth reception buffers 26 and 28 are woken up in response to the first clock signal DCL1 corresponding to the dummy clock, and write the write data in internal registers.

Figure 11:
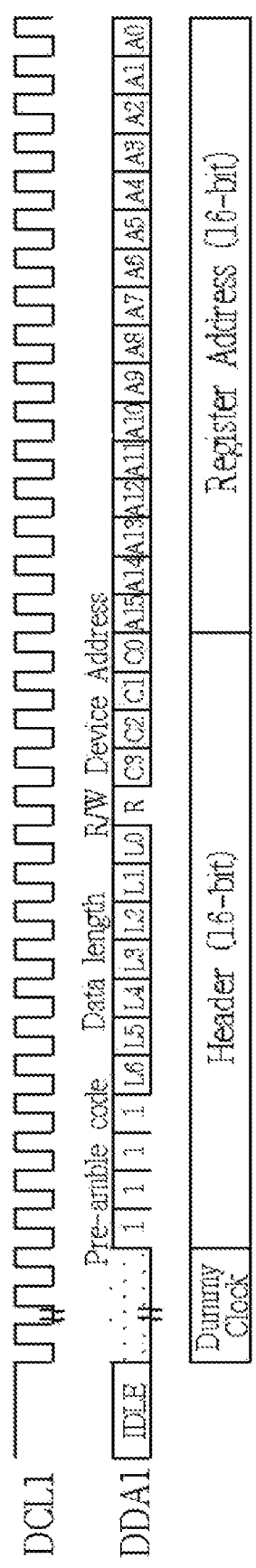

Referring to FIG. 11, the preamble code of the header indicates (1,1,1,1) and the command indicates read. This defines the MPI protocol when the microcontroller 30 transmits a read data request to the specific source driver SRIC.

The microcontroller 30 occupies the first and second MPI buses L1 and L2 in order to transmit the read data request to the specific source driver SRIC, and transmits the first clock signal DCL1 and the first data signal DDA1 to the source drivers 20. The first data signal DDA1 includes a dummy clock, a header, and a register address, wherein the header includes a preamble code (1,1,1,1), a read command, and a device address corresponding to the specific source driver SRIC.

In the source drivers 20, the third and fourth reception buffers 26 and 28 are woken up in response to the first clock signal DCL1 corresponding to the dummy clock, and the specific source driver SRIC corresponding to the device address prepares to transmit read data to the microcontroller 30. The third and fourth reception buffers 26 and 28 of other source drivers not corresponding to the device address may be configured to be turned off in order to reduce current consumption.

Figure 12:
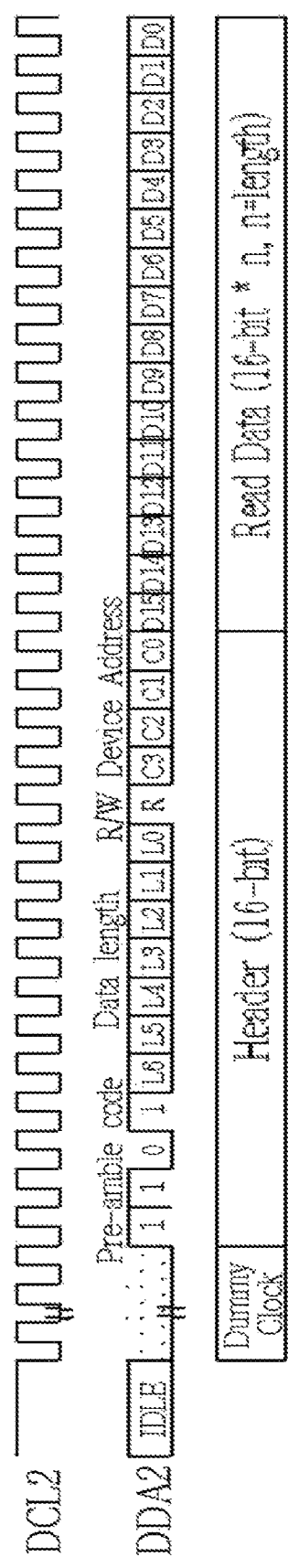

Referring to FIG. 12, the preamble code of the header indicates (1,1,0,1) and the command indicates read. This defines the MPI protocol when the specific source driver SRIC having received the read data request from the microcontroller 30 transmits read data to the microcontroller 30. In such a case, in a read data transmission operation, a read request is preferentially performed in order to prevent a specific source driver from abnormally occupying the first and second MPI buses L1 and L2.

The specific source driver SRIC having received the read data request occupies the first and second MPI buses L1 and L2 and transmits the second clock signal DCL2 and the second data signal DDA2 to the microcontroller 30. The second data signal DDA2 includes a dummy clock, a header, and read data, wherein the header includes a preamble code (1,1,0,1), a read command, and a device address corresponding to the specific source driver SRIC.

In order to transmit the second data signal DDA2 to the microcontroller 30, the specific source driver SRIC may use, as the second clock signal DCL2, the clock signal PCLK restored from the input signal CED or the internal clock signal OSC CLK generated therein. For example, in the display-on period, the specific source driver SRIC may use the clock signal PCLK restored from the input signal CED as the second clock signal DCL2, and in the display-off period, the specific source driver SRIC may use the internal clock signal OSC CLK generated therein as the second clock signal DCL2. Detection of a touch to the display panel 10 in the display-off period may be used for performing a knock-on function of turning on a turned-off liquid crystal screen by knocking on the screen. In the display-off period, since only a touch to the display panel 10 is detected, it is possible to sufficiently detect a touch by using the internal clock signal OSC CLK.

In the microcontroller 30, the first and second reception buffers 36 and 38 are woken up in respond to the second clock signal DCL2 transmitted from the specific source driver SRIC and corresponding to the dummy clock, and receive the second clock signal DCL2 and the second data signal DDA2 including the read data.

Figure 13:
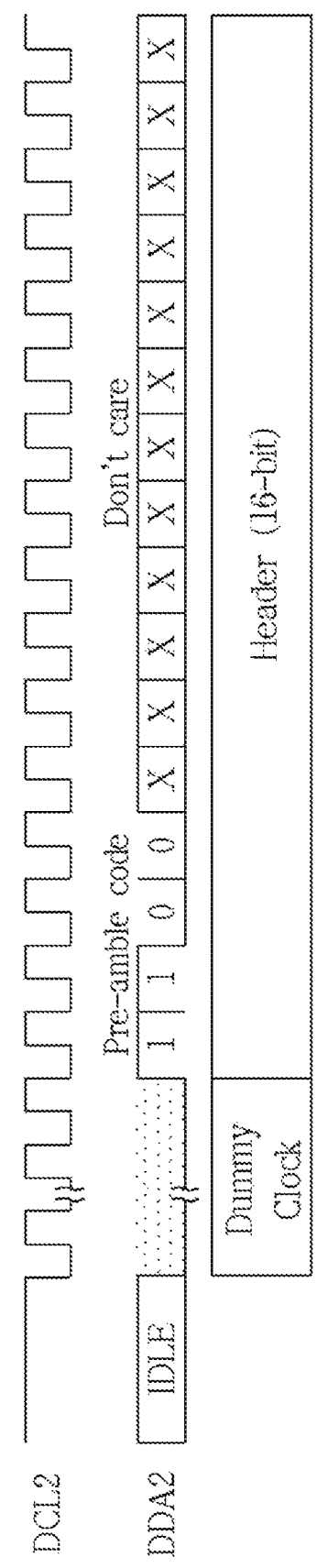

Referring to FIG. 13, the preamble code of the header indicates (1,1,0,0). This defines the MPI protocol when the specific source driver SRIC transmits a data ready command to the microcontroller 30. In such a case, in the data ready command, a data ready request of the microcontroller 30 should be preferential. Data corresponding to the data ready request is written in a register of the specific source driver SRIC.

The specific source driver SRIC having received the data ready request occupies the first and second MPI buses L1 and L2 and transmits the second clock signal DCL2 and the second data signal DDA2 to the microcontroller 30. The second data signal DDA2 includes a dummy clock and a header, wherein the header includes a preamble code (1,1,0,0) and data of other bits of the header is ignored (don't care).

In the microcontroller 30, the first and second reception buffers 36 and 38 are woken up in response to the second clock signal DCL2 transmitted from the specific source driver SRIC and corresponding to the dummy clock, and receive read data included in the second data signal DDA2 transmitted from the specific source driver SRIC.

FIG. 14 is a timing diagram for explaining the data ready operation of the MPI protocol-based display device.

Referring to FIG. 14, the microcontroller 30 transmits the first clock signal DCL1 and the first data signal DDA1 including a data ready request to the specific source driver SRIC. The first data signal DDA1 includes a dummy clock, a header, a register address, and write data, wherein the header includes a write command and the write data includes the data ready request. That is, the microcontroller 30 transmits the data ready request to the specific source driver SRIC, thereby assigning a data ready command authority to the specific source driver SRIC. The specific source driver SRIC writes data corresponding to the data ready request in a register.

The specific source driver SRIC having the data ready command authority occupies the first and second MPI buses L1 and L2 when data ready occurs, and transmits the second data signal DDA2, in which the header includes a preamble code (1,1,0,0), and the second clock signal DCL2 to the microcontroller 30. That is, when the data ready occurs, the specific source driver SRIC having the data ready command authority puts a data ready command into the header of the second data signal DDA2 and transmits the second data signal DDA2 to the microcontroller 30. The occurrence of the data ready may indicate that read data sensed from the display panel 10 is full in a sensing buffer (not illustrated).

The microcontroller 30 having received the data ready command from the specific source driver SRIC occupies the first and second MPI buses L1 and L2, and transmits the first data signal DDA1, in which the header includes the data ready command, and the first clock signal DCL1 to the specific source driver SRIC.

The specific source driver SRIC having received the data ready command from microcontroller 30 occupies the first and second MPI buses L1 and L2, and transmits the second data signal DDA2 including a preamble code (1,1,0,1) and read data and the second clock signal DCL2 to the microcontroller 30.

As described above, in accordance with the display device according to the present embodiment, it is possible to perform bi-directional communication through the first and second MPI buses L1 and L2 shared based on the MPI protocol, so that it is possible to improve a transfer rate and electromagnetic interference (EMI) and reduce the number of pins and the number of lines. Furthermore, the on and off of the first and second reception buffers 36 and 38 of the microcontroller 30 and the on and off of the third and fourth reception buffers 26 and 28 of the source drivers 20 are controlled by the MPI protocol, so that it is possible to reduce current consumption as compared with a general MPI.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A display device comprising:
   first and second source drivers configured to receive a first clock signal and a first data signal from a microcontroller on the basis of a multi point-to-point interface (MPI) protocol, acquire read data by driving touch sensors of a display panel, and transmit a second clock signal and a second data signal including the read data on the basis of the MPI protocol;
   the microcontroller configured to transmit the first clock signal and the first data signal to the first and second source drivers on the basis of the MPI protocol, receive the second clock signal and the second data signal on the basis of the MPI protocol, and calculate a touch coordinate of the display panel by using the read data included in the second data signal; and
   first and second MPI buses configured to connect the first and second source drivers and the microcontroller to each other such that data communication is possible between the first and second source drivers and the microcontroller,
   wherein a transmission type for occupying the first and second MPI buses between the microcontroller and the first and second source drivers is set in the MPI protocol.

2. The display device according to claim 1, wherein the microcontroller occupies the first and second MPI buses in a first transmission type of putting a write or read command into the first data signal and transmitting the first data signal to any one of the first and second source drivers and a second transmission type of putting the write command into the first data signal and transmitting the first data signal to all the first and second source drivers.

3. The display device according to claim 1, wherein the microcontroller puts authority for transmission of read data or a data ready command into the first data signal and transmits the first data signal to any one of the first and second source drivers, and
 a specific source driver having received the authority occupies the first and second MPI buses in a third transmission type of putting the read data into the second data signal and transmitting the second data signal and a fourth transmission type of putting the data ready command into the second data signal and transmitting the second data signal.

4. The display device according to claim 1, wherein the MPI protocol is formed in a format including a dummy clock, a header, a register address, and data.

5. The display device according to claim 4, wherein, when the first clock signal corresponding to the dummy clock is received, buffers of the first and second source drivers for receiving the first clock signal and the first data signal are woken up, and
 when the second clock signal corresponding to the dummy clock is received, buffers of the microcontroller for receiving the second clock signal and the second data signal are woken up.

6. The display device according to claim 5, wherein the microcontroller comprises:
 first and second transmission buffers configured to transmit the first clock signal and the first data signal to the first and second MPI buses; and
 first and second reception buffers configured to receive the second clock signal and the second data signal through the first and second MPI buses,
 wherein the first and second reception buffers are set to be woken up when the second clock signal corresponding to the dummy clock is received from any one of the first and second source drivers.

7. The display device according to claim 5, wherein each of the first and second source drivers comprises:
 third and fourth transmission buffers configured to transmit the second clock signal and the second data signal to the first and second MPI buses; and
 third and fourth reception buffers configured to receive the first clock signal and the first data signal through the first and second MPI buses,
 wherein the third and fourth reception buffers are set to be woken up when the first clock signal corresponding to the dummy clock is received from the microcontroller.

8. The display device according to claim 4, wherein the header includes a preamble code, a data length, a read and write, and a device address.

9. The display device according to claim 8, wherein the preamble code defines the transmission type for occupying the first and second MPI buses according to logic levels of bits, and
 the transmission type comprises:
 a first transmission type in which the microcontroller transmits write and read commands to a specific source driver;
 a second transmission type in which that the microcontroller transmits the write command to all the first and second source drivers;
 a third transmission type in which that the specific source driver transmits read data to the microcontroller; and
 a fourth transmission type in which that the specific source driver transmits a data ready command to the microcontroller,
 wherein the microcontroller occupies the first and second MPI buses in the first and second transmission types and the specific source driver occupies the first and second MPI buses in the third and fourth transmission types.

10. The display device according to claim 1, wherein the microcontroller occupies the first and second MPI buses in a data ready request, puts data corresponding to the data ready request into the first data signal, and transmits the first data signal to the specific source driver, thereby assigning data ready command authority to the specific source driver,
 the specific source driver having received the data ready command authority from the microcontroller occupies the first and second MPI buses when data ready occurs, puts a data ready command into the second data signal, and transmits the second data signal to the microcontroller,
 the microcontroller occupies the first and second MPI buses when the data ready command is received from the specific source driver, puts a read command into the first data signal, and transmits the first data signal to the specific source driver, and
 the specific source driver having received the read command from the microcontroller occupies the first and second MPI buses and transmits the second data signal including the read data and the second clock signal to the microcontroller.

11. The display device according to claim 1, wherein, when the second data signal and the second clock signal are transmitted to the microcontroller in a display-on period, the first and second source drivers use a third clock signal restored from an input signal, in which a clock has been embedded in image data, as the second clock signal.

12. The display device according to claim 1, wherein, when the second data signal and the second clock signal are transmitted to the microcontroller in a display-off period, the first and second source drivers use an internal clock signal generated in an oscillator, as the second clock signal.

13. A display device comprising:
 a microcontroller including first and second transmission buffers that transmit a first clock signal and a first data signal to a plurality of source drivers on the basis of a multi point-to-point interface (MPI) protocol and first and second reception buffers that receive a second clock signal and a second data signal from the plurality of source drivers on the basis of the MPI protocol;
 the plurality of source drivers including third and fourth transmission buffers that transmit a second clock signal and a second data signal to the microcontroller on the basis of the MPI protocol and third and fourth reception buffers that receive the first clock signal and the first data signal from the microcontroller on the basis of the MPI protocol;
 a first MPI bus configured to connect the first and second transmission buffers of the microcontroller and the third and fourth reception buffers of the plurality of source drivers to each other such that data communication is possible between the first and second transmission buffers of the microcontroller and the third and fourth reception buffers of the plurality of source drivers; and a second MPI bus configured to connect the first and second reception buffers of the microcontroller and the third and fourth transmission buffers of the plurality of source drivers to each other such that data communication is possible between the first and second reception buffers of the microcontroller and the third and fourth transmission buffers of the plurality of source drivers, wherein a transmission type for occupying the first and second MPI buses between the microcontroller and the plurality of source drivers is set in the MPI protocol.

14. The display device according to claim 13, wherein the microcontroller occupies the first and second MPI buses in a first transmission type of putting a write or read command into the first data signal and transmitting the first data signal to any one of the plurality of source drivers and a second transmission type of putting the write command into the first data signal and transmitting the first data signal to the plurality of source drivers.

15. The display device according to claim 13, wherein the microcontroller puts authority for transmission of read data or a data ready command into the first data signal and transmits the first data signal to any one of the plurality of source drivers, and a specific source driver having received the authority occupies the first and second MPI buses in a third transmission type of putting the read data into the second data signal and transmitting the second data signal and a fourth transmission type of putting the data ready command into the second data signal and transmitting the second data signal.

16. The display device according to claim 13, wherein the MPI protocol is formed in a format including a dummy clock, a header, a register address, and data, the third and fourth reception buffers of the plurality of source drivers are woken up when the first clock signal corresponding to the dummy clock is received, and the first and second reception buffers of the microcontroller are woken up when the second clock signal corresponding to the dummy clock is received.

17. The display device according to claim 16, wherein the header includes a preamble code, a data length, a read and write, and a device address.

18. The display device according to claim 17, wherein the preamble code defines the transmission type for occupying the first and second MPI buses according to logic levels of bits, and the transmission type comprises:
a first transmission type in which the microcontroller transmits write and read commands to a specific source driver;
a second transmission type in which that the microcontroller transmits the write command to the plurality of source drivers;
a third transmission type in which that the specific source driver transmits read data to the microcontroller; and
a fourth transmission type in which that the specific source driver transmits a data ready command to the microcontroller, wherein the microcontroller occupies the first and second MPI buses in the first and second transmission types and the specific source driver occupies the first and second MPI buses in the third and fourth transmission types.

19. The display device according to claim 13, wherein, when the second data signal and the second clock signal are transmitted to the microcontroller in a display-on period, the plurality of source drivers use a third clock signal restored from an input signal, in which a clock has been embedded in image data, as the second clock signal.

20. The display device according to claim 13, wherein, when the second data signal and the second clock signal are transmitted to the microcontroller in a display-off period, the plurality of source drivers use an internal clock signal generated in an oscillator, as the second clock signal.

* * * * *